No. 816,861. PATENTED APR. 3, 1906.
W. H. JAMES.
PHOTOGRAPHIC SHEET.
MODEL. APPLICATION FILED OCT. 30, 1905.

UNITED STATES PATENT OFFICE.

WILLIAM HENRY JAMES, OF IOWA CITY, IOWA.

PHOTOGRAPHIC SHEET.

No. 816,861.     Specification of Letters Patent.     Patented April 3, 1906.

Application filed October 30, 1905. Serial No. 285,161.

*To all whom it may concern:*

Be it known that I, WILLIAM HENRY JAMES, a citizen of the United States, residing at Iowa City, in the county of Johnson and State of Iowa, have invented new and useful Improvements in Photographic Sheets, of which the following is a specification.

My invention pertains to photographic sheets; and it contemplates the provision of a photographic sheet having on that portion of its face which surrounds the sight part a blended border—*i. e.*, a border having an outer dark portion and an inner portion of mezzo shade—whereby the sheet when placed at a slight distance from the eye simulates a raised panel, or, in other words, a concavo-convex panel arranged with its convex side foremost, and thereby adds materially to the finish of a photograph and the mount on which the same is placed.

With the foregoing in mind the invention will be fully understood from the following description and claims when taken in connection with the accompanying drawing, forming part of this specification, in which the figure is a front elevation of a photographic sheet provided with my novel blended border, the said sheet being shown as bearing a picture and attached to a photographic mount.

Referring by letter to the said drawing, A is a photographic mount, which may be and preferably is a card of pasteboard, and B is the photographic sheet constituting the present and preferred embodiment of my invention. The said sheet B is provided with the usual sight part $a$, designed to bear a picture $b$, as illustrated, and is adapted to be affixed to the mount A by adhesive interposed between its flat back side and the face of the mount or any other suitable means. The sheet B is peculiar in that it has a blended border C around its sight part $a$. This blended border comprises an outer dark or dense portion $c$ and an inner portion $d$ of mezzo shade interposed or resting between the dark portion $c$ and the sight part $a$. The dark portion $c$ of the border gradually merges into the mezzo-shade part $d$ thereof, and the said mezzo-shade part in turn gradually merges into the sight part $a$ of the sheet. The effect of this is to give to the sheet when placed at a distance of a few feet from the eye the appearance of a raised panel—that is, a panel having a concave back side and a convex forward side. Such an appearance obviously contributes materially to the finish of the photograph as a whole and places the picture in relief with reference to the mount, as is highly desirable.

It will be apparent from the foregoing that while my novel blended border adds materially to the finish of a photographic sheet it does not appreciably increase the cost of the sheet or render it difficult to print upon the sight part of the sheet.

Having described my invention, what I claim, and desire to secure by Letters Patent, is—

1. As a new article of manufacture, a photographic sheet of paper or other suitable material, having a sight part designed to receive a picture, and also having a border surrounding the sight part and made up of an outer dark or dense portion and an inner mezzo-shade portion; the dark or dense portion being gradually merged into the mezzo-shade portion and the said mezzo-shade portion being gradually merged into the sight part, whereby the sheet simulates a raised panel.

2. As a new article of manufacture, a photographic device comprising a mount, and a flat photographic sheet of paper or other suitable material affixed at its back to the face of the mount; the said photographic sheet having a sight part designed to receive a picture, and also having a border surrounding the sight part and made up of an inner mezzo-shade portion which gradually merges into the sight part and an outer dark or dense portion which gradually merges into the mezzo-shade portion, whereby the sheet simulates a raised panel.

In testimony whereof I have hereunto set my hand in presence of two subscribing witnesses.

WILLIAM HENRY JAMES.

Witnesses:
    G. A. EWING,
    F. P. CHAPMAN.